United States Patent
Grewe et al.

(10) Patent No.: US 10,752,255 B2
(45) Date of Patent: Aug. 25, 2020

(54) SURROUNDINGS MODELING DEVICE FOR A DRIVER ASSISTANCE SYSTEM FOR A MOTOR VEHICLE

(71) Applicant: Continental Teves AG & Co. oHG, Frankfurt (DE)

(72) Inventors: Ralph Grewe, Frankfurt am Main (DE); Steffen Schaack, Mömbris (DE); Stefan Lüke, Rosbach vor der Höhe (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 262 days.

(21) Appl. No.: 15/969,421

(22) Filed: May 2, 2018

(65) Prior Publication Data
US 2018/0251134 A1 Sep. 6, 2018

Related U.S. Application Data

(63) Continuation of application No. PCT/DE2016/200468, filed on Oct. 10, 2016.

(30) Foreign Application Priority Data

Nov. 3, 2015 (DE) .......................... 10 2015 221 481

(51) Int. Cl.
*B60W 50/06* (2006.01)
*B60W 50/00* (2006.01)
(Continued)

(52) U.S. Cl.
CPC .......... *B60W 50/06* (2013.01); *B60W 10/184* (2013.01); *B60W 30/12* (2013.01);
(Continued)

(58) Field of Classification Search
CPC ...... B60W 50/06; B60W 50/04; B60W 50/00; B60W 40/04; B60W 10/184;
(Continued)

(56) References Cited

U.S. PATENT DOCUMENTS

| | | | | |
|---|---|---|---|---|
| 2010/0292867 A1* | 11/2010 | Bohm | ................. | G06F 9/45533 701/1 |
| 2016/0148510 A1* | 5/2016 | Vanholme | ................. | G08G 1/16 703/6 |
| 2017/0287335 A1* | 10/2017 | Ansari | ................. | B60W 40/04 |

FOREIGN PATENT DOCUMENTS

| | | |
|---|---|---|
| DE | 102013207905 A1 | 4/2009 |
| DE | 202008016892 U1 | 4/2009 |

(Continued)

OTHER PUBLICATIONS

International Search Report and Written Opinion dated Feb. 3, 2017 from corresponding International Patent Application No. PCT/DE2016/200468.
(Continued)

*Primary Examiner* — Dale Moyer

(57) ABSTRACT

A surroundings modeling device for a driver assistance system for a motor vehicle, includes a separating device configured to separate a total vehicle surroundings model into a static vehicle surroundings model based on a first look-ahead distance and a dynamic vehicle surroundings model based on a second look-ahead distance. A first real-time computing device is configured to calculate the dynamic vehicle surroundings model on the basis of the first look-ahead distance within a maximum response time. A second real-time computing device is configured to calculate the static vehicle surroundings model on the basis of the second look-ahead distance with a characteristic response
(Continued)

time. A situation analysis device is configured to change the separation process on the basis of an analysis of the total vehicle surroundings model.

10 Claims, 3 Drawing Sheets

(51) Int. Cl.
*B60W 50/04* (2006.01)
*B60W 40/04* (2006.01)
*B60W 10/184* (2012.01)
*B60W 30/12* (2020.01)

(52) U.S. Cl.
CPC ........ *B60W 40/04* (2013.01); *B60W 50/0097* (2013.01); *B60W 50/045* (2013.01); *B60W 2050/0006* (2013.01); *B60W 2554/00* (2020.02); *B60W 2556/00* (2020.02); *B60W 2900/00* (2013.01)

(58) Field of Classification Search
CPC ....... B60W 2050/006; B60W 2254/00; B60W 2556/00; B60W 2900/00; B60W 30/12; B60W 50/0097; B60W 50/045; G08G 1/1965; G08G 1/1964; G08G 1/166; G08G 1/164; G08G 1/165; G05G 1/1966
See application file for complete search history.

(56) References Cited

FOREIGN PATENT DOCUMENTS

| | | | |
|---|---|---|---|
| DE | 102010006828 | A1 | 8/2011 |
| DE | 102013101079 | A1 | 8/2013 |
| DE | 102013201545 | A1 | 7/2014 |
| DE | 102013207904 | A1 | 10/2014 |
| DE | 102013018315 | A1 | 4/2015 |

OTHER PUBLICATIONS

German Search Report dated Sep. 30, 2016 for corresponding German Patent Application No. 10 2015 221 481.8.

* cited by examiner

SURROUNDINGS MODELING DEVICE FOR A DRIVER ASSISTANCE SYSTEM FOR A MOTOR VEHICLE

CROSS REFERENCE TO RELATED APPLICATION

This application is a continuation of International application No. PCT/DE2016/200468, filed Oct. 10, 2016, which claims priority to German patent application No. 10 2015 221 481.8, filed Nov. 3, 2015, each of which is hereby incorporated by reference.

TECHNICAL FIELD

The technical field relates generally to driver assistance systems for motor vehicles and more particularly to a surroundings modeling device and method for a driver assistance system for a motor vehicle.

BACKGROUND

With real-time systems, a distinction is made between "hard" and "soft" real-time systems. Hard real-time systems guarantee and supply a correct result within a predefined, maximum response time.

This results in high requirements, in terms of real-time capability, being put on the basis of the system, for example on the operating system.

This necessitates the use of special real-time operating systems, for example. Known representatives are, e.g., OSEK, an abbreviation for "Offene Systeme und deren Schnittstellen für die Elektronik in Kraftfahrzeuge" [in English: "Open Systems and their Interfaces for the Electronics in Motor Vehicles"], or respectively OSEK-OS is a specification for real-time operating systems for embedded systems, which has been adopted by the OSEK Consortium.

QNX—a proprietary POSIX-enabled Unix-like real-time operating system—or vxWorks—likewise a real-time capable operating system can additionally be used as the real-time operating system.

By contrast, a soft real-time system achieves on average an acceptable response time, but cannot guarantee this for every case. However, this also results in significantly reduced demands being placed on the operating system, and makes the use of widespread systems such as Linux or even Windows possible.

Compared with hard real-time operating systems, soft real-time systems offer, as a general rule, more extensive APIs and e.g. better support of libraries or abstraction standards such as, e.g., OpenCV, Eigen, OpenGL, and OpenCL.

This makes it possible to develop algorithms and framework software more efficiently and more rapidly. Current uses include, e.g., research projects for rapid prototyping.

Driver assistance systems or "Advanced Driver Assistance Systems", abbreviated to ADAS, are additional electronic devices in motor vehicles for assisting the driver in certain driving situations.

Today's ADAS systems are, as a general rule, constructed as hard real-time systems. This is necessary when constructing systems such as, e.g., an emergency brake assist, in order to guarantee that it will still be possible to react to changes that occur in the driving situation in good time, i.e., within the system limits.

SUMMARY

A first aspect relates to a surroundings modeling device for a driver assistance system for a motor vehicle, wherein the device includes a separating device which is configured to separate a total vehicle surroundings model to be calculated into a static vehicle surroundings model based on a first look-ahead distance and a dynamic vehicle surroundings model based on a second look-ahead distance. The device also includes a first real-time computing device configured to calculate the dynamic vehicle surroundings model on the basis of the first look-ahead distance within a maximum response time. The device further includes a second real-time computing device configured to calculate the static vehicle surroundings model on the basis of the second look-ahead distance with a characteristic response time. The device also includes a situation analysis device configured to change the separation process on the basis of an analysis of the total vehicle surroundings model.

In other words, the safety and main path required for the redundancy and the corresponding functional characteristics are successfully split in an advantageous manner such that the real-time requirements for large parts of the surroundings model as well as the trajectory planning are reduced to such an extent that they also make it possible to use a system with soft real-time requirements.

Soft real-time requirements are described, for example, by characteristic response times which can be exceeded with predefined deviations, while hard real-time requirements are, for example, described by maximum response times which are to be observed.

Advantageously, the device makes it possible for a part of the vehicle surroundings model to not have to be calculated in a hard real-time capable manner but, nevertheless, a guaranteed response time of the system can be ensured.

The device advantageously makes it possible to use a situation analysis which supervises and, if necessary, corrects the part which is not hard real-time capable, in order to ensure a guaranteed response time, including in critical situations.

In other words, it is, for example, advantageously achieved that a method for processing and correcting data from surroundings monitoring and processing algorithms running at low frequency is provided without a guaranteed maximum response time in at least one (highly) dynamic surroundings monitoring, situation analysis, and control part.

This advantageously makes it possible to ensure a high frequency and a guaranteed response time of the total system, including in the case of delayed processing of data in the low-frequency processing part.

The term "low frequency" as used herein is, in this case, related to the criterion of the non-guaranteed response time, i.e., cyclical fluctuations occur during the provision of the results.

Here, the present invention does not necessarily mean an absolutely "low frequency", although systems which are not hard real-time capable do have a typical lower limit, under which the response time is determined more by "system effects" instead of the algorithm running time.

In the case of Windows systems, this is typically a time of, for example, 10 ms, resulting in a maximum deterministic "control frequency" of, for example, less than 100 Hz, without a safety factor. In the case of Linux systems, this frequency which is referred to as low by the present invention is typically somewhat higher, for example approximately 200 Hz.

The term "high frequency" as used herein, refers to, for example, a frequency of more than 500 Hz.

For example, the present invention advantageously makes it possible for, in particular, algorithms for monitoring the static surroundings and for path planning, which are resource-intensive and require significant development effort, to proceed transversely with a high range in the low-frequency part.

This displacement into the low-frequency part is, for example made possible, since the static surroundings model does not alter in the typical time periods or respectively time intervals and, thus, no "dynamic" response to this is required from the system perspective.

By contrast, in the high-frequency part of algorithms which monitor the dynamic vehicle surroundings such as e.g. tracking of moving objects, pedestrian detection or traffic light detection, a guaranteed maximum response time has to be observed, e.g. in order to guarantee the monitoring of the necessity for an emergency braking of the preceding vehicle.

A situation analysis and the control take place, for example, in the high-frequency part, wherein the trajectory is usually moved along transversely from the low-frequency part, but with the longitudinal guidance, for example, being completely executed in the high-frequency part, taking into account the data from the static surroundings model which has a high look-ahead distance. This arrangement provides a guaranteed maximum response time of the system to dynamic road users.

This can be effected, for example, in the event of a vehicle suddenly going back into a lane or in the event of emergency braking. In the case of an advantageous utilization of the static surroundings model, it can be decided whether an emergency braking operation and/or an emergency avoiding maneuver should be performed.

In this case, the surroundings model is not calculated, for example, but the last data record from the low-frequency part, that is to say e.g. the lane course or peripheral development, is, by way of example, also taken into account during the analysis.

The device advantageously makes it possible, for example, for the situation analysis in the high-frequency part to additionally overlay the predefined path transversely with a correction.

The correction can, in this case, result from the analysis of the dynamic traffic situation, taking into account the static surroundings model from the low-frequency part, that is to say e.g. lane markings, in order to thus be able to react e.g. to a "swerving" of the neighboring vehicle in the adjacent lane with a guaranteed, maximum response time.

In other words, a split into static vehicle surroundings and dynamics vehicle surroundings is advantageously successfully provided, and an increased look-ahead for the static surroundings is used, in order to thus be able to calculate this part with a soft real-time capable system having a low ASIL level or respectively requirements for the functional safety.

Therefore, for example, a split takes place into static vehicle surroundings and dynamic vehicle surroundings or respectively into a soft and a hard real-time capable system, i.e., a hybrid calculation, i.e., a calculation having two different types of real-time capable systems, is performed for the driver assistance system.

This advantageously makes it possible to provide larger look-ahead distances and safety concepts with redundant systems.

In this case, a higher look-ahead distance means, for example, that a trajectory is planned in advance for multiple seconds, for example up to 10 s, and is then moved along by the control.

In order to enable this trajectory planning and the subsequent movement along said trajectory, a great deal of information regarding the static vehicle surroundings model is provided, e.g. the courses of lanes in the vehicle surroundings and detected road signs or traffic lights which are assigned to the lanes, to which they apply.

In order to reliably and robustly obtain this information from a fusion of surroundings sensor technology and of surroundings data, for example from a map, as well as planning a trajectory based on this map, a high algorithmic effort is required.

A further second aspect relates to a surroundings modeling method for a driver assistance system for a motor vehicle.

The method includes separating a total vehicle surroundings model to be calculated into a static vehicle surroundings model based on a first look-ahead distance and a dynamic vehicle surroundings model based on a second look-ahead distance with the aid of a separating device. The method also includes calculating the dynamic vehicle surroundings model on the basis of the first look-ahead distance within a maximum response time with the aid of a first real-time computing device. The method further includes calculating the static vehicle surroundings model on the basis of the second look-ahead distance within a characteristic response time with the aid of a second real-time computing device. The method also includes changing the separation process of the total vehicle surroundings model to be calculated on the basis of an analysis of the total vehicle surroundings model by utilizing a situation analysis device.

In this case, the method can further split the trajectory planning into a non-hard real-time capable part having a large look-ahead distance—for example 100 m or 200 m—and a hard real-time capable part.

In one advantageous embodiment, the situation analysis device is configured to change the separation process on the basis of a comparison of a predicted response time of the first real-time computing device with a threshold for the maximum response time and/or on the basis of a comparison of a predicted response time of the second real-time computing device with a threshold for the characteristic response time. This advantageously makes it possible to respond to peak loads that occur and to observe a predefined response time.

In other words, the situation analysis device is, for example, configured to change the separation process on the basis of a comparison of a predicted first response time of the first real-time computing device with a first threshold for the maximum response time and/or on the basis of a comparison of a predicted second response time of the second real-time computing device with a second threshold for the characteristic response time.

In another advantageous embodiment, the first real-time computing device has a plurality of control blocks and/or that the second real-time computing device has a plurality of control blocks. This advantageously makes it possible to realize a modular construction of the device.

In another advantageous embodiment, the plurality of the control blocks of the first real-time computing device is configured as a chain and/or the plurality of the control blocks of the second real-time computing device is configured as a chain. This advantageously makes it possible to realize a modular construction of the device.

In another advantageous embodiment, the first real-time computing device is configured to calculate the dynamic vehicle surroundings model on the basis of the first look-ahead distance of up to 50 m, or of up to 100 m, or of up to 200 m within a maximum response time of up to 3 s, of up to 5 s, or of up to 10 s, and with a range of up to 200 m, or of up to 500 m, or of up to 1000 m.

In another advantageous embodiment, the first real-time computing device is configured to output a calculated total surroundings model and/or a calculated trajectory planning on the basis of the dynamic vehicle surroundings model with a first calculation cycle of up to 1 s or of up to 2.5 s or of up to 5 s.

In another advantageous embodiment, the second real-time computing device is configured to output a calculated total surroundings model and/or a calculated trajectory planning on the basis of the static vehicle surroundings model with a second calculation cycle of up to 3 s or of up to 6 s or of up to 10 s.

In another advantageous embodiment, the first real-time computing device is configured to calculate the dynamic vehicle surroundings model with a first integrity level, and wherein the second real-time computing device is designed to calculate the static vehicle surroundings model with a second integrity level.

This advantageously makes it possible, as a result of an adapted splitting of the system functions among different integrity levels as well as using a sufficient look-ahead, to use a soft real-time capable system, at least for the part of the control chain having lower requirements for the functional safety compared with the remaining part.

In another advantageous embodiment, the first integrity level is higher than the second integrity level.

The described configurations and further developments can be combined with each other in any way desired.

Further possible configurations, further developments and implementations of the present invention also comprise combinations of features of the present invention described above or below with respect to the embodiments, but which are not explicitly indicated.

The appended drawings are intended to convey a further understanding of the embodiments. The appended drawings illustrate embodiments and are used, in connection with the description, to explain concepts of the present invention.

Other embodiments and many of the indicated advantages are set out with respect to the figures of the drawings. The represented elements of the figures of the drawings are not necessarily shown to scale with respect to each other.

DETAILED DESCRIPTION OF EMBODIMENT EXAMPLES

Figure 1:
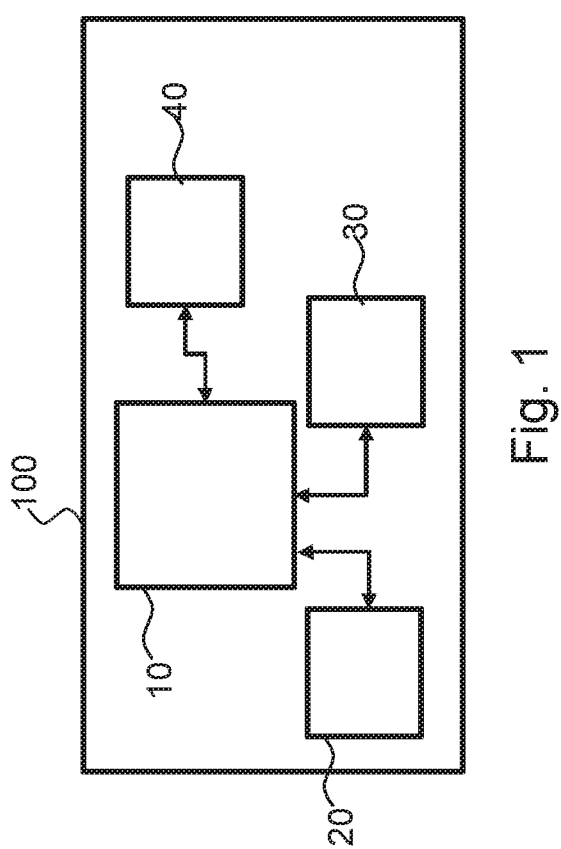
FIG. 1 shows a schematic representation of a surroundings modeling device for a driver assistance system for a motor vehicle according to one embodiment example.

Unless otherwise indicated, the same reference numerals designate elements, parts, components or method steps which are similar or have a similar function in the figures of the drawings.

The motor vehicle or respectively vehicle is, for example, a motor vehicle or a hybrid motor vehicle such as a motorcycle, a car, a bus, a truck, a rail vehicle, a ship, an aircraft such as a helicopter or airplane, or, for example, a bicycle.

FIG. 1 shows a schematic representation of a surroundings modeling device 100 for a driver assistance system for a motor vehicle according to one embodiment example.

The surroundings modeling device 100 for a driver assistance system for a motor vehicle comprises a separating device 10, a first real-time computing device 20, a second real-time computing device 30, and a situation analysis device 40.

The separating device 10 is configured to separate a total vehicle surroundings model to be calculated into a static vehicle surroundings model based on a first look-ahead distance and a dynamic vehicle surroundings model based on a second look-ahead distance.

The first real-time computing device 20 is configured to calculate the dynamic vehicle surroundings model on the basis of the first look-ahead distance within a maximum response time.

The second real-time computing device 30 is configured to calculate the static vehicle surroundings model on the basis of the second look-ahead distance with a characteristic response time.

The situation analysis device 40 is configured to change the separation process on the basis of an analysis of the total vehicle surroundings model.

Figure 2:
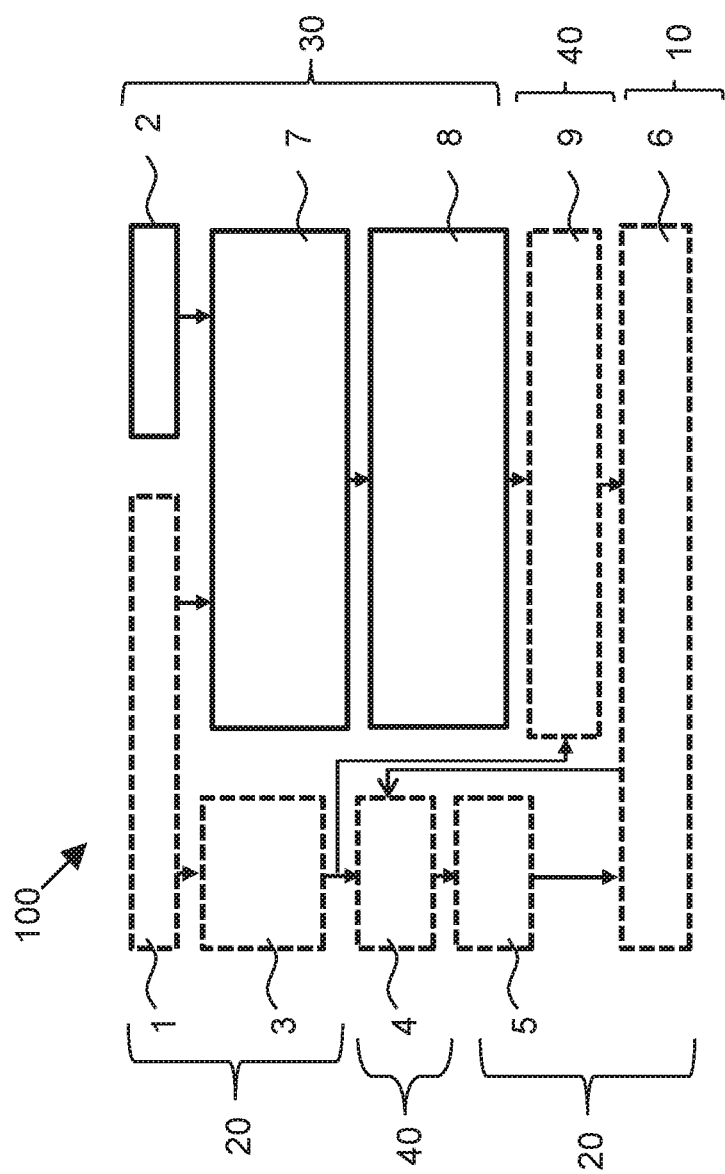
FIG. 2 shows a schematic representation of a surroundings modeling device for a driver assistance system for a motor vehicle according to one embodiment example of the present invention.

FIG. 2 shows a schematic representation of a surroundings modeling device for a driver assistance system for a motor vehicle according to one embodiment example.

FIG. 2 shows a schematic overview of the device 100. Blocks having hard real-time requirements are represented by dashes, while blocks having soft real-time requirements are represented with a continuous line. The device 1 can be referred to as a hybrid calculation system for a driver assistance system, since two different real-time computing devices are used.

Here, the blocks or respectively the control blocks have, for example, the following functions:

Surroundings sensor technology 1 can monitor and provide data, for example sensor data, for a total vehicle surroundings model which is to be calculated.

The total vehicle surroundings model to be calculated can have a minimum surroundings model 3 in a rapid safety path.

A situation analysis device in the form of block 4 can be configured to change the separation process on the basis of an analysis of the total vehicle surroundings model.

A control block in the form of block 5 can be coupled to the situation analysis device 40 in the form of block 4 and can be configured to intervene in the separation process of the total vehicle surroundings model to be calculated into a static vehicle surroundings model and a dynamic vehicle surroundings model.

This means that the situation analysis device 40 can be configured to displace proportions to be calculated, in a distributed manner, to the real-time computing devices or to alter said proportions, in order to observe a maximum response time with the hard real-time system.

In other words, instead of a comprehensive result of the non-hard real-time capable second real-time computing device 30, which result is to be calculated in an elaborate manner, a calculable result of the non-hard real-time capable second real-time computing device 30 or a stored result of the first real-time computing device 20 is used.

A supervising block in the form of block 6 can supervise these alterations.

A situation analysis block 9 can be configured to provide a dynamic control of the trajectory with an increased look-ahead distance.

The chain of functions for a current ADAS system, e.g., an emergency brake assist ("EBA") function which is purely based on dynamic objects, would be formed by the blocks 1, 3, 4, 5, and 6, which all have to fulfil hard real-time requirements and are assigned to the first real-time computing device 20, since these calculations have to be performed within a maximum response time.

In this case, an amended combination of the blocks can be used or a switch can be made to static surroundings information of the second path or respectively of the second chain.

The standard path for functions having a high degree of automation is formed by the blocks 1, 2, 7, 8, 9, 6.

A trajectory having a temporal look-ahead of multiple seconds or respectively a spatial look-ahead of multiple 100 m is calculated or respectively planned by the blocks 1, 2, 7, 8.

This trajectory is, for example, subsequently moved along by a control having hard real-time requirements in the form of the situation analysis block 9.

The aim of this chain of functions is, for example, to provide a convenient normal driving function. In this case, it is assumed, for example, that in most cases a convenient trajectory can be planned both longitudinally and transversely with a high look-ahead of, for example, up to 10 s or up to 1000 m.

To this end, the conduct of other road users is, for example, predicted and a vehicle response at low acceleration, that is to say a large safety buffer, is calculated. This conduct corresponds, for example, to a human driver who drives, for example, economically and/or in a manner focused on comfort.

In this case, the blocks 3 and 7 are distinguished, for example, by the scale of the surroundings model. The surroundings model in block 3 is, for example, kept to a minimum and, in addition to ADAS functions, only allows emergency operation, while block 7, which has a large scale and look-ahead distance, supports the entire function setup, including, for example, changing lanes.

The trajectory output by block 8 is, as a general rule, less time-critical due to the high look-ahead. If it is now envisaged in this control block 9 that, in particular, dynamic objects are additionally received from the hard real-time capable block 3, a particular system constellation can be achieved compared with non-hybrid driver assistance systems.

For example, both the surroundings model 7 and the trajectory planning 8 can be easily predicted and are therefore less time-critical than, e.g., an EBA intervention, due to the large look-ahead and due to the predominantly static content in a block such as the control 9.

It can be, for example, that in the case of a look-ahead of 5 s, the trajectory of the trajectory planning is output with a cycle of 1 s; in this constellation an output which is 50 ms too late would not be relevant.

The controller would then be updated, for example, in the case of a look-ahead of only 3950 ms instead of 4000 ms, thus obtaining a sufficient safety margin from idling of the input data of the controller.

In a normal situation, block 9 therefore simply regulates, for example, the obtained trajectory. In order to be able to respond to dynamic situations such as, e.g., suddenly before a braking vehicle, block 9 additionally contains a situation analysis for dynamic objects.

Since said situation analysis is, for example, provided by the hard real-time capable path via block 3, it is at all times ensured that it is possible to react sufficiently quickly to a dynamic alteration in the driving situation such as, for example, in the case of emergency braking or in the event of another vehicle suddenly going back into a lane.

The block 6 takes over, for example, the supervision of the system and the changeover to the emergency path, if a malfunction or an unexpected event occurs on the main path. To this end, in addition to the control variables, block 6 receives, for example, the current length of the trajectory, on which the control specification is based, from block 9.

If the length of the trajectory falls below a first threshold, e.g., 3.5 s, the supervisory system outputs a warning. This warning can, e.g., prompt the driver to take over via the HMI. If the trajectory falls below a second threshold value, the supervisory block 6 changes over to the safety path after a time interval of 2 s, for example.

The safety path via block 4 and block 5 can be active, for example—possibly for the entire usage time, which is also referred to as a "hot standby". The safety path can additionally be activated by the supervisory system in the form of block 6, as soon as the length of the trajectory received by block 9 falls below a threshold, for example a threshold of 3.5 s is used.

The result of this is that the blocks 2, 7 and 8 can also be executed with a system with soft real-time requirements, with which an operating system such as, for example, embedded Linux can also be used.

This offers corresponding advantages in terms of the development effort and, due to the large range of functions of the operating system available to the runtime such as, e.g., network or respectively communications stack and file systems for persistent data storage, the possibility of automatic updates.

The blocks 2, 7, and 8 are, for example, assigned to the second real-time computing device 30, since these calculations of the blocks 2, 7 and 8 simply have to be performed with a characteristic response time.

The requirements for the functional safety can be reduced for the soft real-time capable chain, by constructing the hard real-time capable chain 1, 3, 4, 5, 6 such that the chain safeguards against accidents occurring, while accepting a possibly uncomfortable control.

The static information of the surroundings model 7 can, in this case, be additionally made available to the situation analysis 4. If the surroundings model 7 fails, data with a relatively high look-ahead distance are still available to the situation analysis 4.

It could be assumed, e.g., by the device 100 that, in the case of data which are received too late by more than, for example, 200 ms, the surroundings model 7 has failed. In this case, the emergency path of the chain 1, 3, 4, 5, 6 would take over.

The remaining look-ahead distance of, for example, 3800 ms is used to reduce the vehicle speed to such an extent that safe operation of the vehicle until the driver takes over or respectively until a safe condition is reached is possible, even with the small look-ahead distance of the remaining path.

Figure 3:
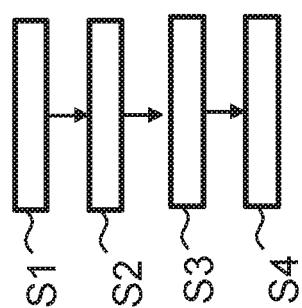
FIG. 3 shows a schematic representation of a flow diagram of a surroundings modeling model for a driver assistance system for a motor vehicle according to one embodiment example of the present invention.

FIG. 3 shows a schematic representation of a flow diagram of a surroundings modeling method for a driver assistance system for a motor vehicle according to one embodiment example of the present invention.

The surroundings modeling method for a driver assistance system for a motor vehicle may include, at s1, separating a total vehicle surrounds model into a static vehicle surroundings model based on a first look-ahead distance and a dynamic vehicle surroundings model based on a second look-ahead distance with the aid of a separating device 10.

The method may also include, at S2, calculating the dynamic vehicle surroundings model on the basis of the first look-ahead distance within a maximum response time with the aid of a first real-time computing device 20.

The method may further include, at S3, calculating the static vehicle surroundings model on the basis of the second look-ahead distance within a characteristic response time with the aid of a second real-time computing device 30.

The method may also include, at S4, changing the separation process of the total vehicle surroundings model to be calculated on the basis of an analysis of the total vehicle surroundings model by means of a situation analysis device 40.

Although the present invention has been described above with reference to preferred embodiment examples, it is not limited to these, but can be modified in a variety of ways. In particular, the present invention can be altered or modified in various ways, without deviating from the basic invention.

In addition, it is pointed out that the wording "comprising" and "having" does not exclude any other elements or steps and "a" does not exclude a plurality.

It is additionally pointed out that features or steps, which have been described with reference to one of the above embodiment examples, can also be used in combination with other features or steps of other embodiment examples described above.

The invention claimed is:

1. A surroundings modeling device for a driver assistance system for a motor vehicle, comprising:
    a separating device configured to separate a total vehicle surroundings model to be calculated into a static vehicle surroundings model based on a first look-ahead distance and a dynamic vehicle surroundings model based on a second look-ahead distance;
    a first real-time computing device configured to calculate the dynamic vehicle surroundings model on the basis of the first look-ahead distance within a maximum response time;
    a second real-time computing device configured to calculate the static vehicle surroundings model on the basis of the second look-ahead distance with a characteristic response time; and
    a situation analysis device configured to change the separation process on the basis of an analysis of the total vehicle surroundings model.

2. The device according to claim 1, wherein the situation analysis device is configured to change the separation process on the basis of a comparison of a predicted first response time of the first real-time computing device with a first threshold for the maximum response time and/or on the basis of a comparison of a predicted second response time of the second real-time computing device with a second threshold for the characteristic response time.

3. The device according to claim 1, wherein the first real-time computing device comprises a plurality of control blocks and/or wherein the second real-time computing device comprises a plurality of control blocks.

4. The device according to claim 3, wherein the plurality of the control blocks of the first real-time computing device comprises a chain and/or wherein the plurality of the control blocks of the second real-time computing device comprises a chain.

5. The device according to claim 1, wherein the first real-time computing device is configured to calculate the dynamic vehicle surroundings model on the basis of the first look-ahead distance of up to 200 meters within a maximum response time of up to 10 seconds.

6. The device according to claim 1, wherein the first real-time computing device is configured to output a calculated total surroundings model and/or a calculated trajectory planning on the basis of the dynamic vehicle surroundings model with a first calculation cycle of up to 5 seconds.

7. The device according to claim 1, wherein the second real-time computing device is configured to output a calculated total surroundings model and/or a calculated trajectory planning on the basis of the static vehicle surroundings model with a second calculation cycle of up to 10 seconds and with a range of up to 1000 meters.

8. The device according to claim 1,
    wherein the first real-time computing device is configured to calculate the dynamic vehicle surroundings model with a first integrity level, and
    wherein the second real-time computing device is configured to calculate the static vehicle surroundings model with a second integrity level.

9. The device according to claim 8, wherein the first integrity level is higher than the second integrity level.

10. A surroundings modeling method for a driver assistance system for a motor vehicle, wherein the method comprises:
    separating a total vehicle surroundings model to be calculated into a static vehicle surroundings model based on a first look-ahead distance and a dynamic vehicle surroundings model based on a second look-ahead distance with the aid of a separating device;
    calculating the dynamic vehicle surroundings model on the basis of the first look-ahead distance within a maximum response time with the aid of a first real-time computing device;
    calculating the static vehicle surroundings model on the basis of the second look-ahead distance within a characteristic response time with the aid of a second real-time computing device; and
    changing the separation process of the total vehicle surroundings model to be calculated on the basis of an analysis of the total vehicle surroundings model utilizing a situation analysis device.

* * * * *